US012656847B2

(12) United States Patent
Yoshigi

(10) Patent No.: US 12,656,847 B2
(45) Date of Patent: Jun. 16, 2026

(54) POWER SUPPLY APPARATUS WITH POWER RELAY FUNCTION

(71) Applicant: DENSO WAVE INCORPORATED, Chita-gun (JP)

(72) Inventor: Masayasu Yoshigi, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 78 days.

(21) Appl. No.: 17/978,612

(22) Filed: Nov. 1, 2022

(65) Prior Publication Data

US 2023/0139505 A1 May 4, 2023

(30) Foreign Application Priority Data

Nov. 1, 2021 (JP) ................................. 2021-179019

(51) Int. Cl.
| | |
|---|---|
| *G06F 1/28* | (2006.01) |
| *G05B 9/02* | (2006.01) |
| *G05B 19/05* | (2006.01) |
| *H01H 47/00* | (2006.01) |

(52) U.S. Cl.
CPC ................. *G06F 1/28* (2013.01); *G05B 9/02* (2013.01); *G05B 19/05* (2013.01); *H01H 47/002* (2013.01)

(58) Field of Classification Search
CPC .. G06F 1/28; G05B 9/02; G05B 19/05; H01H 47/002; H02J 4/00
See application file for complete search history.

(56) References Cited

U.S. PATENT DOCUMENTS

| | | | | |
|---|---|---|---|---|
| 6,057,609 A | * | 5/2000 | Nagai | H02J 9/061 |
| | | | | 307/85 |
| 6,665,806 B1 | * | 12/2003 | Shimizu | G06F 1/3203 |
| | | | | 713/340 |
| 2005/0050370 A1 | * | 3/2005 | Vyssotski | G06F 1/28 |
| | | | | 713/300 |
| 2013/0019809 A1 | * | 1/2013 | McCallum | A01K 7/00 |
| | | | | 210/143 |
| 2015/0071480 A1 | * | 3/2015 | Jones | H02J 7/0044 |
| | | | | 381/384 |
| 2016/0379768 A1 | * | 12/2016 | Pham | G06F 1/30 |
| | | | | 307/142 |
| 2021/0089101 A1 | * | 3/2021 | Cheng | G06F 1/3206 |

FOREIGN PATENT DOCUMENTS

JP 2006-294007 A 10/2006

* cited by examiner

*Primary Examiner* — Paul Yen
(74) *Attorney, Agent, or Firm* — Oliff PLC

(57) ABSTRACT

In a power supply apparatus, a first relay unit relays power inputted from an outside of the apparatus, wherein the power having only one type of power specification. A second relay unit relays power inputted from the outside of the apparatus, wherein the power having a plurality of types of power specification is selectively inputted to the second relay unit. A module, connected to the apparatus, is activated responsively to the power supplied from the first relay unit. Information is acquired from the activated module, information showing a predetermined specification of the power supplied to the first relay unit. The second relay unit supplies the module with the power outputted from the second relay unit when a specification of the power inputted to the second relay unit corresponds to the predetermined specification, thereby enabling the second relay unit to relay the power to an electric load.

5 Claims, 4 Drawing Sheets

POWER SUPPLY APPARATUS WITH POWER RELAY FUNCTION

CROSS-REFERENCE TO RELATED APPLICATION

This application is based on and claims the benefit of priority from earlier Japanese Patent Application No. 2021-179019 filed Nov. 1, 2021, the description of which is incorporated herein by reference.

BACKGROUND

Technical Field

The present invention relates to a power supply apparatus with a power relay function, and in particular, to a power supply apparatus equipped with a relay unit that relays power input from an external power source and outputs the power to an electric load.

Related Art

As one of conventional power apparatuses, there is known a power supply apparatus exemplified a patent reference 1. In this power supply apparatus, a relay unit is provided which outputs power via a bus connector connected to a bus line. From the bus line, the power is supplied to a plurality of apparatuses serving as electric loads such as air conditioners or machine tools.

PATENT DOCUMENTS

[Patent Document 1] JP-2006-294007 A

Problems to be Solved

With view of the foregoing related art, it is conceivable that a power supply apparatus can be equipped with a first relay unit, which has one specification of power inputted from an external power source (e.g., DC power) and a second relay unit, which has multiple specifications of power inputted from an external power source (e.g., DC power and AC power) to be selected from among multiple specifications of power input from an external power source. With such a configuration, the user can select the specification of the power inputted from the external power source to the second relay unit and physically and electrically connect a desired device, whose power specification corresponds to the selected power specification, to the second relay unit.

However, if the specification of the power inputted from the external power supply to the second relay unit does not correspond to the specification of power of a device electrically connected to the second relay unit, the device powered through the second relay unit may be damaged.

SUMMARY

Hence, when considering the foregoing easily-conceivable art, it is desired to provide a power supply apparatus which still makes it possible to that a user can select a desired specification of power, from multiple power specifications, which is to be inputted to a relay unit of the apparatus from an external power source and the device connected to the relay unit can be prevented from being damaged due to a user's erroneous connection of the device to the relay unit.

A first exemplary embodiment is related to a power supply apparatus comprising:

a first relay unit configured to relay power inputted from an outside of the power supply apparatus, to be outputted to the outside, power having only one type of power specification being allowed to be inputted to the first relay unit for the power relay thereof;

a second relay unit configured to relay power inputted from an outside of the power supply apparatus, to be outputted to the outside, power having a plurality of types of power specification being allowed selectively to be inputted to the second relay unit for the power relay thereof, wherein a predetermined device is connected to the power supply apparatus, the predetermined device being activated responsively to the power supplied from the first relay unit, power supplied from the second relay unit to the predetermined device being entitled to have a predetermined specification;

an information acquiring unit configured to acquire information including information showing the predetermined specification, form the predetermined device activated on the power supplied from the first relay unit; and a power controller configured to supply the predetermined device with the power outputted from the second relay unit when a specification of the power inputted to the second relay unit corresponds to the predetermined specification contained in the information included in the information acquired by the information acquiring unit.

According to the above configuration, the power supply apparatus has a first relay unit and a second relay unit, and the specification of the power supplied from the second relay unit is set at a predetermined specification. One specification (DC or AC) is determined for the power input to the first relay unit from an external power source, and the first relay unit relays the inputted power for output thereof. The specification of the power inputted to the second relay unit from the external power source is selected from multiple specifications (e.g., DC and AC power and their voltage values). The second relay unit inputs, relays, and outputs power having the selected specification. Thus, the user can select the specification of the power inputted from the external power supply to the second relay unit and connect the predetermined device, whose power specification corresponds to the selected power specification, to the second relay unit.

In this configuration, the first relay unit has one specification for the power inputted from the external power source. Thus, it is unlikely that the user will make a mistake in the specification of the power inputted to the first relay unit. Therefore, the predetermined device can be reliably and stably operated by the power supplied from the first relay unit. The information acquiring unit can therefore acquire information including the predetermined specification from the predetermined device that was reliably and stably activated by the power supplied from the first relay unit.

The power controller causes the second relay unit to supply power to the predetermined device only when the power specification inputted to the second relay unit corresponds to the predetermined specification contained in the information obtained by the information acquiring unit. Thus, the predetermined device can stably perform, without damage to the predetermined device (such as modules), the process using the power supplied by the second relay unit. In contrast, the power controller will not allow power to be supplied from the second relay unit to the predetermined device (such as modules connected by a user) if the specification of power inputted to the second relay unit does not correspond to the predetermined specification contained in the information. This prevents damage to the predetermined device that is powered by the second relay unit.

In this exemplified configuration, when the predetermined device is activated by the power supplied from the first relay unit, communication between the predetermined device (such as modules), which is connected to the power supply apparatus, and the power supply apparatus can be performed through, for example, a bus communication technique.

It is preferred, in the first exemplary embodiment, the information acquiring unit is configured to acquire the information by communication with the predetermined device activated on the power supplied from the first relay unit.

It is still preferred that, in the first exemplary embodiment, the power inputted to the second relay unit from the outside is given a specification selectively set between DC power and AC power whose voltage is higher than the DC power.

It is also preferred that, in the first exemplary embodiment, the power controller is configured to compare a voltage of the power inputted to the second relay unit with a reference voltage set based on the predetermined specification, prohibit the second relay unit from supplying the power to the predetermined device when the voltage of the power inputted to the second relay unit is higher than or equal to the reference voltage, and allow the second relay unit to supply the power to the predetermined device when the voltage of the power inputted to the second relay unit is lower than the reference voltage.

According to this configuration, even if a voltage higher than the reference voltage is mistakenly supplied to a predetermined device that is supposed to be supplied with a voltage of the predetermined power specification from the second relay unit, damage to the specified device can be avoided or reduced.

Still, another preferred example is provided such that in the first exemplary embodiment, the power controller is configured to determine whether a specific condition is met, the condition being that the specification of the power inputted to the second relay unit is AC power and the predetermined specification included in the information acquired by the information acquiring unit, and prohibit the second relay unit from supplying with the predetermined device with the power when the specific condition is met. According to this configuration, even if AC power is mistakenly supplied to a predetermined device that is supposed to be supplied with DC power from the second relay unit, damage to the predetermined device can be avoided or reduced.

Still, another preferred example is provided such that in the first exemplary embodiment, the power inputted to the first relay unit from the outside is set to DC power. According to this configuration, the DC power supplied from the first relay unit can be used to operate a predetermined device, such a module connected to an electric load.

Still, it is preferred that the first relay unit is configured to output power therefrom via a first bus connector connected to the predetermined device, and the second relay unit is configured to output power therefrom via a second bus connector connected to the predetermined device. According to this configuration, by connecting the first bus line to the first bus connector, power can be supplied from the first relay unit to multiple devices connected to the first bus line. Also, by connecting the second bus line to the second bus connector, power can be supplied from the second relay unit to multiple devices connected to the second bus line.

A second exemplary embodiment is related to a method of controlling a power supply apparatus comprising:

a first relay unit configured to relay power inputted from an outside of the power supply apparatus, to be outputted to the outside, power having only one type of power specification being allowed to be inputted to the first relay unit for the power relay thereof; and a second relay unit configured to relay power inputted from an outside of the power supply apparatus, to be outputted to the outside, power having a plurality of types of power specification being allowed selectively to be inputted to the second relay unit for the power relay thereof, wherein a predetermined device is connected to the power supply apparatus, the predetermined device being activated responsively to the power supplied from the first relay unit, power supplied from the second relay unit to the predetermined device being allowed to have a predetermined specification.

The method comprises steps of:

acquiring information including information showing the predetermined specification, form the predetermined device activated on the power supplied from the first relay unit; and controlling the second relay unit to supply the predetermined device with the power outputted from the second relay unit when a specification of the power inputted to the second relay unit corresponds to the predetermined specification contained in the information included in the information acquired.

By the foregoing method, the identical advantages to those obtained in the first exemplary embodiment can also be provided.

DETAILED DESCRIPTION OF THE PREFERRED EMBODIMENTS

Figure 1:
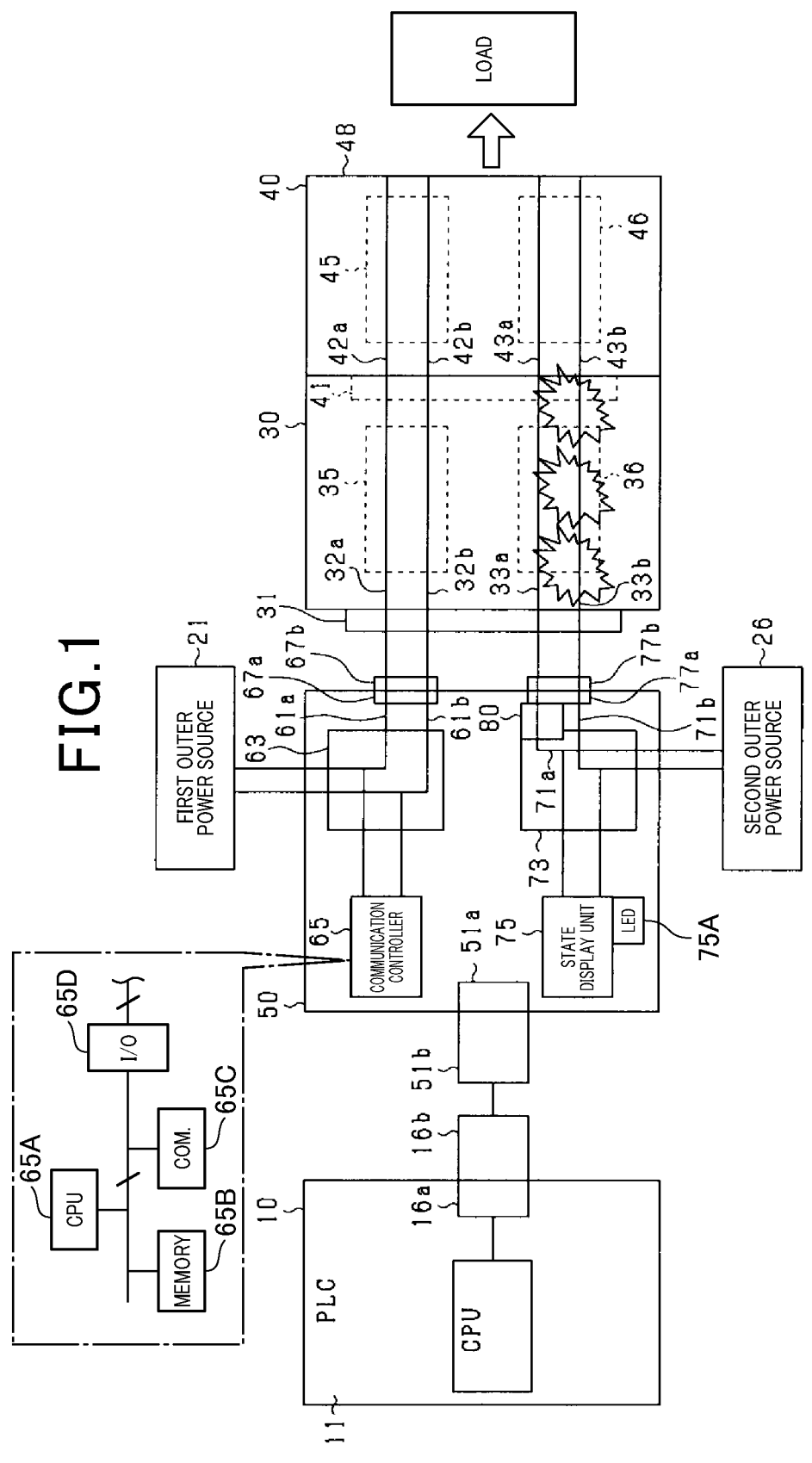
FIG. 1 is a block diagram pictorially outlining a power supply apparatus and circuitry connected to the power supply apparatus.

With reference to the accompanying drawings, an embodiment of a power supply apparatus will now be described. The power supply apparatus is electrically connected to a PLC (Programmable Logic Controller) and operates to relay power inputted from an external power source and outputs the relayed power to a module connected to the power supply apparatus. As shown in FIG. 1, the power supply apparatus 50 includes a PLC 1 0, a first external power supply 21, a second external power supply 26, and a first module 30 are connected. In addition, a second module 40 is electrically connected to the power supply apparatus 50 via the first module 30.

A specification specifying the type of power inputted from the first external power supply 21 (external power supply) to the power supply apparatus 50 is set at both a voltage of 18-32 [V] DC and a maximum current of 10 [A]. This power specification is set to be accepted by the power supply apparatus 50. Similarly, a specification specifying the type of power to be accepted to the second external power supply 26 (external power supply) to the power supply apparatus 50 is set at both a voltage of 18-32 [V] DC or 8-240 [V] AC and a maximum current of 10 [A].

The first module 30 and the second module 40 should be modules which correspond in the power specifications to the second external power supply 26. For example, if the second external power supply 26 inputs 18-32 [V] DC to the power supply apparatus 50, a DC module corresponding in its voltage and type to the DC voltage must be connected as the first module 30 and second module 40. If the second external power supply 26 inputs 8-240 [V] AC to the power supply apparatus 50, AC modules corresponding in their voltage values and type to the AC voltage must be connected as the first module 30 and the second module 40.

The PLC 10 is equipped with a CPU 11, Ethernet (registered trademark) port 16a, and other necessary components.

The power supply apparatus 50 is equipped with an Ethernet (wired local area connection) port 51a, bus lines 61a, 61b, 71a, and 71b, relay units 63 and 73, a communication controller 65, a status display 75, and a connection switching circuit 80. The Ethernet port 51a is connected to Ethernet port 16a of the PLC 10 via a connector 51b and a connector 16b. In other words, the Ethernet port 16a of the PLC 10 is connected to the Ethernet port 51a of the power supply apparatus 50.

The bus lines 61a, 61b, 71a, 71b include a power line to supply power and a communication line to send and receive signals based on a known bus communication protocol, respectively. The first and second relay units 63 and 73 include terminal connections, wiring, switches, etc., respectively. As mentioned above, the first relay unit 63 has the specification for the power inputted from the first external power supply 21, with the voltage ranging from 18-32 [V] DC (one specification for the type of voltage) and the maximum current determined to be 10 [A]. In other words, the power inputted from the first external power source 21 to the first relay unit 63 is determined to be DC power.

The specification for the power inputted from the second external power supply 26 to the second relay unit 73 are set at 18-32 [V] DC or 8-240 [V] AC (two types of specifications for voltage) which are selected by the user and the maximum current is determined to be 10 [A]. In other words, the specification (voltage value and voltage type of DC power or AC power) of the power to be inputted from the second external power source 26 to the second relay unit 73 is selected from the multiple specifications prepared in advance. In detail, the specification of the power inputted from the second external power supply 26 to the second relay unit 73 is intended to prevent circuit damage. Thus, the user can select either DC power with a desired voltage value or AC power with a voltage value higher than the voltage of the DC power. The second relay unit 73 has terminal connections for common use for 18-32 [V] DC and 8-240 [V] AC.

The power supply lines of the bus lines 61a and 61b are connected to the first external power supply 21 via the first relay unit 63. In other words, the first relay unit 63 relays and outputs the power input from the first external power supply 21 at its original value. The power and communication lines provided by the bus lines 61a and 61b are also connected to the communication controller 65 via the first relay unit 63.

The power supply lines of the bus lines 71a and 71b are connected to the second external power supply 26 via the second relay unit 73. In other words, the second relay unit 73 relays and outputs the power inputted from the second external power supply 26. The power lines of the bus lines 71a and 71b are also connected to the status indicator 75 via the second relay unit 73. The communication lines of the bus lines 71a and 71b are connected to the communication controller 65 via the second relay unit 73.

The status indicator 75 includes an LED (indicator light) 75A, and the LED 75A is turned on based on commands from the communication controller 65.

Figure 5:
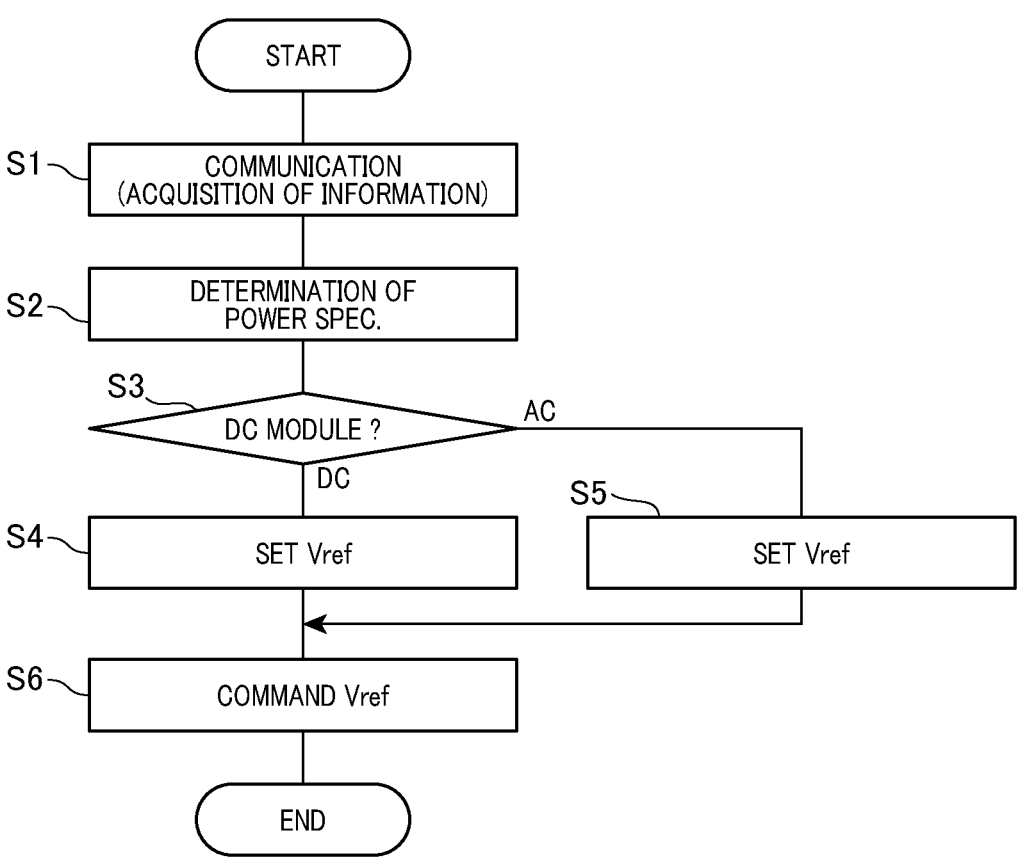
FIG. 5 is a flowchart showing the processing performed by a communication controller installed in the power supply apparatus.

The communication controller 65 is provided as a known computer with a microcontroller 65A, memory 65B, communication unit 65C, input/output interface 65D, and other necessary elements, and has communication capabilities. Therefore, at the time of its startup, the communication controller 65 (i.e., CPU 65A) calls the program for power relay control stored in advance in memory 65B into the work area of the CPU 65A and executes the processing steps of the program one after another. An overview of this process is shown in FIG. 5. The communication controller 65 is operated by power supplied from the power line provided as the bus line 61a and controls the relay units 63, 73, the status indicator 75, and the connection switching circuit 80 for power relay control. The communication controller 65 also executes various desired processes for the load based on commands from the PLC 10.

The first module 30 (functioning as a predetermined device) includes an input port 31, bus lines 32a, 32b, 33a, 33b, a first circuit 35, and a second circuit 36. The bus lines 32a, 32b, 33a, 33b include a power line to supply power and a communication line to send and receive signals, respectively. The first module 30 is operated by the power supplied by the first relay unit 63 and performs communication with the communication controller 65 via the communication line. This communication causes the first module 30 to supply power from the second relay unit 73 to the connected equipment (i.e., the first and second modules 30, 40) under predetermined conditions. This communication will cause the supply of power from the second relay unit 73 to the connected devices (i.e., the first and second modules 30, 40) under predetermined conditions.

The power and communication lines of the bus lines 32a and 32b (serving as first bus lines) are connected to the power and communication lines of the bus lines 61a and 61b of the power supply apparatus 50 via an input port 31, a first bus connector 67b, and a first bus connector 67a of the power supply apparatus 50, respectively. As a result, the first module 30 is operated by the electric power supplied by the first relay unit 63. The power and communication lines of the bus lines 33a and 33b (serving as second bus lines) are connected to the power and communication lines of the bus lines 71a and 71b of the power supply apparatus 50 via an input port 31, a second bus connector 77b, and a second bus connector 77a of the power supply apparatus 50, respectively. The first module 30 is supplied with power from the second relay unit 73, and the specifications of the power are set to selectable DC or AC voltage as the type of voltage. When the DC voltage is selected, a DC voltage value is set to be variable among 18-32 [V] DC. If the AC voltage is selected, an AC voltage value is determined to be variable among 8-240 [V] AC. In the present embodiment, the type and voltage value of those voltages are specified, and those specified information are called predetermined specifications.

Figure 2:
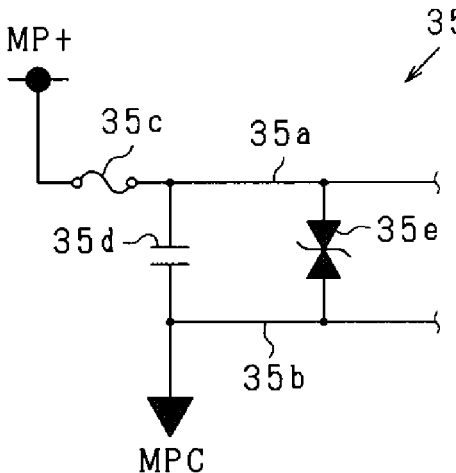
FIG. 2 is a circuit diagram exemplifying a first circuit installed in a module connected to the power supply apparatus.

As shown in FIG. 2, the first circuit 35 includes power lines 35*a*, 35*b*, a fuse 35*c*, a capacitor 35*d*, and an avalanche diode 35*e*. The power line 35*a* forms part of the power line of the bus line 32*a*. The power line 35*a* is supplied with voltage MP+ from the first external power supply 21 via the fuse 35*c*. The power line 35*b* forms part of the power line of the bus line 32*b*. Between the power lines 35*a* and 35*b*, a capacitor 35*d* and an avalanche diode 35*e* are connected in parallel.

Figure 3:
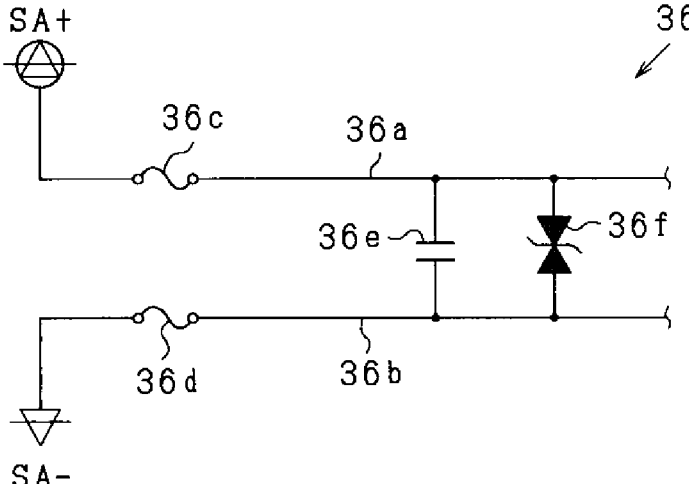
FIG. 3 is a circuit diagram exemplifying a second circuit implemented in the module connected to the power supply apparatus.

FIG. 3 shows the second circuit 36 provided when the first module 30 functions as a DC module. The DC module is defined as a module provided when the second external power supply 26 inputs 18-32 [V] DC to the second relay unit 73 of the power supply apparatus 50. The second circuit 36 includes power lines 36*a*, 36*b*, fuses 36*c*, 36*d*, a capacitor 36*e*, and an avalanche diode 36*f*. The power line 36*a* forms part of the power line of the bus line 33*a*. The power line 36*a* is supplied with voltage SA+ from the second external power supply 26 via the fuse 36*c*. The power line 36*b* forms part of the power line of the bus line 33*b*. The fuse 36*d* is provided in the power line 36*b*. A capacitor 36*e* and an avalanche diode 36*f* are connected in parallel between the power lines 36*a* and 36*b*.

The second module 40 (serving as another predetermined device) has the same configuration as that of the first module 30. That is, the second module 40 has an input port 41, bus lines 42*a*, 42*b*, 43*a*, 43*b*, a first circuit 45, and a second circuit 46. The second module 40 is operated by the electric power supplied from the first relay unit 63 via the first module 3 0 and performs communication regarding power relay with the communication controller 65 via the communication line. Along with this communication execution, the second module 40 executes such operations as supplying power supplied from the second relay unit 73 to devices (electric loads) connected to the second module 40.

The power and communication lines of bus lines 42*a* and 42*b* (serving as the first bus line) are connected to the power and communication lines of bus lines 32*a* and 32*b* of module 1 30 via input port 41, respectively. This communication allows the second module 40 to be operated by the power supplied by the first relay unit 63 via the first module 30. The power lines of the bus line 42*a* and the power lines of the bus line 42*b* are connected to each other at an end 48 of the second module 40. The power and communication lines of the bus lines 43*a* and 43*b* (serving as the second bus lines) are connected to the power and communication lines of the bus lines 33*a* and 33*b* of the first module 30 via input port 41, respectively. The specification of the power supplied from the second relay unit 73 to the second module 40 via the first module 30 is determined by the voltage to be 18-32 [V] DC or 8-240 [V] AC (serving as a predetermined specification). The power lines of the bus line 43*a* and the power lines of the bus line 43*b* are connected to each other at the end 48 of the second module 40.

When the second module 40 functions as a DC module, the second circuit 46 has the same circuit as the second circuit 36. When the second module 40 functions as an AC module, the second circuit 46 is a circuit for 8-240 [V] AC.

The AC module functions as a module corresponding to the case where the second external power supply 26 inputs 8-240 [V] AC to the second relay unit 73 of the power supply apparatus 50.

For example, a user might accidentally connect a DC module as the first module 30 to the power supply apparatus 50 even when 120 [VAC] is inputted to the second relay unit 73 of the power supply apparatus 50. If such a misconnection is made, the following problems arise. Specifically, the fuses 36*c*, 36*d* and avalanche diode 36*f* of the second circuit 36 shown in FIG. 3 are assumed to be inputted with 18-32 [V] DC as voltage SA+. Therefore, if a voltage of 120 [VAC], which is higher than 18-32 [V] DC, is inputted to the second circuit 36, the fuses 36*c*, 36*d* and/or avalanche diode 36*f* may be damaged. In addition, the AC voltage is applied to the first circuit 35 through the circuit in the first module 30, which may damage the fuse 35*c* shown in FIG. 2.

Figure 4:
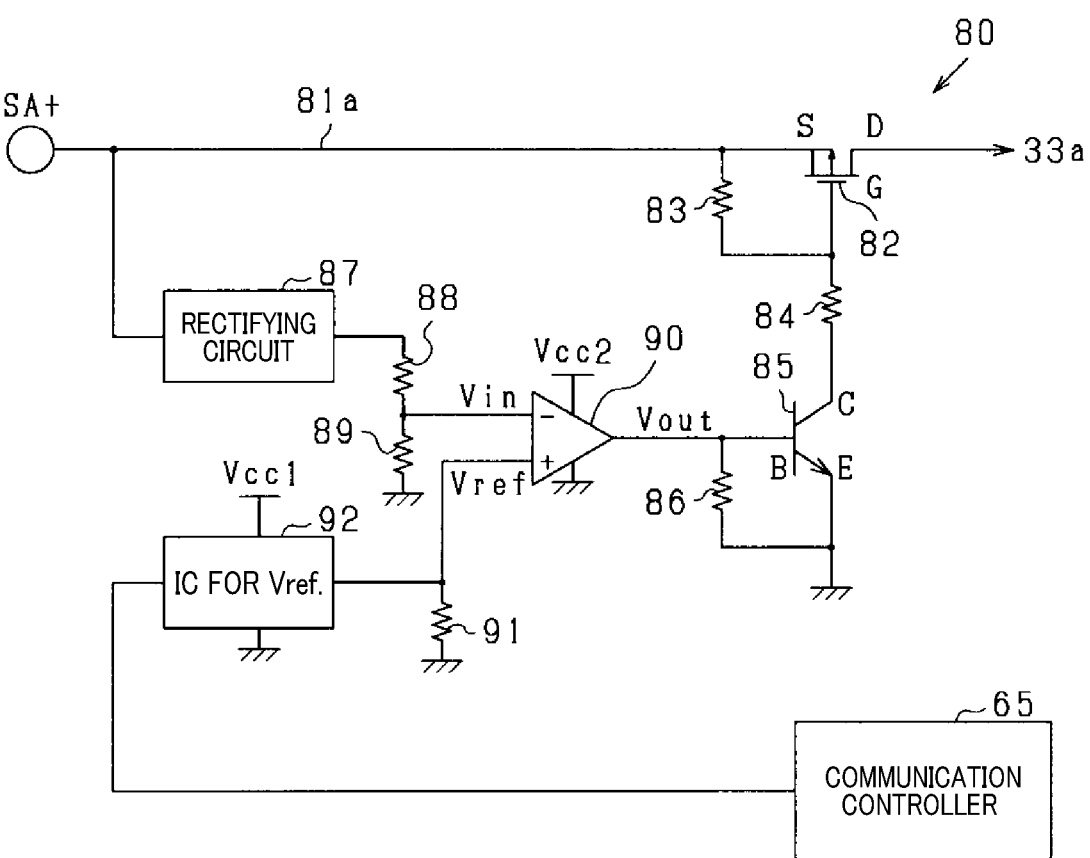
FIG. 4 is a circuit diagram exemplifying the configuration of a connection switching circuit installed in the power supply apparatus.

With consideration of the foregoing erroneous connection issue, the power supply apparatus 50 is equipped with a connection switching circuit 80 that selectively switches the power inputted from the second external power supply 26 between a state in which the power is supplied to the first module 30 and a state in which the power is not supplied to the module 30 (i.e., the power is prohibited from being fed to the module 30). As shown in FIG. 4, the connection switching circuit 80 is provided with a power line 81*a*, a P-channel MOSFET 82, resistors 83, 84, 86, 88, 89, 91, a transistor 85, a rectifier circuit 87, a comparator 90, and an IC92 for Vref.

The power line 81*a* forms part of the power line of bus line 71*a*. The power supply line 81*a* is supplied with voltage SA+ from the second external power supply 26. The power line 81*a* is electrically connected to the power line of the bus line 33*a* to the first module 30 via the MOSFET 82.

The source S of the MOSFET 82 is connected to the power line 81*a*. The drain D of the MOSFET 82 is connected to the power line of the bus line 33*a*. The gate G of the MOSFET 82 is connected to the power line 81*a* via the resistor 83. The gate G of the MOSFET 82 is also connected to GND via the resistor 84 and the transistor 85.

The collector C of the transistor 85 is connected to the gate G of the MOSFET 82 via the resistor 84. The emitter E of the transistor 85 is connected to GND. The base B of the transistor 85 is connected to GND via the resistor 86.

The input side of the rectifier circuit 87 is connected to the power line 81*a*. The rectifier circuit 87 rectifies (converts) the inputted AC current to DC current and outputs the rectified DC current. The output side of the rectifier circuit 87 is connected to GND through the resistors 88 and 89.

The connection point between the resistors 88 and 89 is connected to the inverting input terminal of the comparator 90. The non-inverting input terminal of the comparator 90 is connected to GND via the resistor 91. The connection point between the non-inverting input terminal of the comparator 90 and the resistor 91 is connected to the output terminal of the IC92 for Vref.

As can be seen from the connection shown in FIG. 4, the IC92 for Vref is configured to output a reference voltage Vref from its output terminal based on a command from the communication controller 65.

The communication controller 65 (which functions as an information acquiring unit) performs control for power relay according to the procedure outlined in FIG. 5. The communication controller 65 first performs known bus communication via the communication lines of the bus lines 61*a*, 32*a*, 42*a* with each of the modules 30 and 40 activated by the power supplied by the first relay unit 63 (step S1).

Through that communication, the communication controller 65 obtains information including the specifications (one specific example, voltage values on the lines) for the power of each of the modules 30 and 40.

Then, the communication controller 65, i.e., the CPU 65A, determines specifications (DC or AC and voltage value) of the power which has now been supplied, based on the acquired information (step S2).

The communication controller 65 (which also forms part of the power controller) sets a reference voltage Vref based on the power specifications of the respective modules 30 and 40, which specifications are contained in the acquired information (steps S4, S5).

Specifically, if it is determined that the DC module is connected to the power supply apparatus 50 as the first module 30, the communication controller 65 sets a slightly higher voltage than the highest value of the DC voltage inputted from the second external power supply 26, for example 35 [V], as the reference voltage Vref (step S5). The slightly higher voltage avoids the circuits from being damaged.

On the other hand, if it is determined that an AC module is connected as the first module 30 to the power supply apparatus 50, the communication controller 65 sets a slightly higher voltage than the highest AC voltage inputted from the second external power supply 26, for example 260 [V], as the reference voltage Vref (step S5).

The communication controller 65 then sends the comparator 90 a command for enabling the comparator 90 to set, thereat, the reference voltage Vref decided at steps S4 or S5 (step S6), Hence, the comparator 90 outputs a voltage Vcc2 to the base B of the transistor 85 when the reference voltage Vref inputted to the non-inverting input terminal is higher than the voltage inputted to the inverting input terminal. This turns on the transistor 85 and MOSFET 82, so that power is supplied from the power line 81a to the power line of the bus line 33a.

In contrast, the comparator 90 outputs 0 [V] to the base B of the transistor 85 if the reference voltage Vref inputted to the non-inverting input terminal is lower than the voltage inputted to the inverting input terminal thereof. As a result, the transistor 85 and MOSFET 82 are turned off, whereby the supply of power from the power line 81a to the power line of the bus line 33a is stopped (prohibited).

In other words, the communication controller 65 and comparator 90 will cause the second relay unit 73 to supply power to the first module 30 and the second module 40 only when the specifications of the power inputted to the second relay unit 73 correspond to the specifications of the power assigned to each of the modules 30 and 40 and contained in the acquired information. The communication controller 65 and the comparator 90 cooperatively constitute a power controller.

According to the power supply apparatus 50 with the above configuration, when a DC voltage of 18 to 32 [V] is inputted to the second relay unit 73 from the second external power supply 26 and the modules 30 and 40 are provided as DC modules, the reference voltage Vref inputted to the non-inverting input terminal is higher than the voltage inputted to the inverting input terminal thereof. As a result, a voltage Vcc2 is outputted from the comparator 90 to the base B of the transistor 85, and power is supplied from the power line 81a to the power line of the bus line 33a of the first module 30. In addition, the power is supplied from the power line of the bus line 33a to the power line of the bus line 43a of the second module 40.

On the other hand, if an AC voltage of 120 [V] is inputted from the second external power supply 26 to the second relay unit 73 and at least one of the modules 30 and 40 is provided as a DC module, the reference voltage Vref inputted to the non-inverting input terminal is lower than the voltage inputted to the inverting input terminal in the comparator 90. As a result, a voltage of 0 [V] is outputted from the comparator 90 to the base B of the transistor 85, whereby the supply of power from the power line 81a to the power line of the bus line 33a of the first module 30 is stopped (prohibited). As a result, the power supply from the power line of the bus line 33a to the power line of the bus line 43a of the second module 40 is also stopped (prohibited).

Moreover, when a AC voltage of 120 [V] is inputted from the second external power supply 26 to the second relay unit 73 and both of the modules 30 and 40 are provided as AC modules, the reference voltage Vref inputted to the non-inverting input terminal is higher than the voltage inputted to the inverting input terminal in the comparator 90. As a result, the voltage Vcc2 is outputted from the comparator 90 to the base B of the transistor 85, and power is supplied from power line 81a to the power line of the bus line 33a of the first module 30. In addition, power is supplied from the power line of the bus line 33a to the power line of the bus line 43a of the second module 40, that is, to the electric load which should be powered by the power supply apparatus 50.

When a DC voltage of 18-32 [V] is inputted to the second relay unit 73 from the second external power supply 26 and the modules 30 and 40 are AC modules, the reference voltage Vref inputted to the non-inverting input terminal is higher than the voltage inputted to the inverting input terminal in the comparator 90. As a result, the voltage Vcc2 is outputted from the comparator 90 to the base B of the transistor 85, and power is supplied from the power line 81a to the power line of the bus line 33a of the first module 30.

In addition, power is supplied from the power line of the bus line 33a to the power line of the bus line 43a of the second module 40. In this case, however, there is no risk of damage to the first and second circuits 35, 45, and 36, 46 of the AC modules because the circuits are designed for an AC voltage of 8-240 [V].

The present embodiment has the following advantages.

The power supply apparatus 50 has the first relay unit 63 and the second relay unit 73. The power supply apparatus 50 is connected to the modules 30 and 40, which have predetermined specifications for the power supplied by the second relay unit 73.

The first relay unit 63 has a single specification of type for the power that can be inputted from the first external power source 21, and relays the inputted power to be outputted. The second relay unit 73 has multiple specifications of the type of power that can be inputted from the second external power source 26 and can be selected. he second relay unit 73 receives the input of the selected type of power and relays and outputs that power. Hence, the user can (1) select the specification of the power to be inputted from the second external power source 26 to the second relay unit 73 and (2) connect the first module 30 corresponding to the selected power specification to the second relay unit 73.

The first relay unit 63 has only the one specification for the power to be inputted from the first external power source 21. Therefore, the user is unlikely to make a mistake in the specifications of the power inputted to the first relay unit 63, and the power supplied by the first relay unit 63 can reliably operate the modules 30 and 40. Thus, the communication controller 65 can obtain information, including predetermined specifications (DC or AC, and values thereof), from the modules 30 and 40 that were safely activated by the power supplied by the first relay unit 63.

The communication controller 65 and comparator 90 will cause the second relay unit 73 to supply power to the modules 30 and 40 only when the power specifications of the second relay unit 73 corresponds to the predetermined specifications contained in the information obtained by the communication controller 65. In other words, the communication controller 65 and comparator 90 will cause power to be supplied from the second relay unit 73 to the modules 30 and 40 if the power specifications of the second relay unit 73 corresponds to the predetermined specifications contained in the acquired information. Therefore, the modules 30 and 40 can reliably perform the process using the power supplied by the second relay unit 73.

In contrast, if the power specifications of the second relay unit 73 do not correspond to the predetermined specifications contained in the acquired information, the communication controller 65 and comparator 90 will prohibit power form being supplied from the second relay unit 7 3 to the modules 30 and 40. Therefore, damage to the modules 30, 40 that are supplied with the power from the second relay unit 73 can be prevented or reduced largely.

The communication controller 65 obtains the information through bus communication with the modules 30 and 40 activated by the power supplied by the first relay unit 63, thus being easier to the power supply apparatus 50 to obtain the necessary power specification information.

The specification of the power inputted from the second external power source 26 to the second relay unit 73 is selected between DC power and AC power of a voltage higher than the voltage of this DC power. According to this configuration, even if AC power with a voltage higher than that of DC power is mistakenly inputted from the second relay unit 73 to the modules 30 and 40 which are designed to receive the DC power, damage to the modules 30 and 40 can be reduced or prevented.

The communication controller 65 and the comparator 90 are configured to ensure that, when the voltage of the power inputted to the second relay unit 73 is higher than the reference voltage Vref which has been set based on the predetermined specification included in the information obtained by the communication controller 65, the power of supply from the second relay unit 73 to the modules 30 and 40 is prohibited. According to this configuration, even if a voltage higher than a voltage specified by the predetermined specification is mistakenly supplied from the second relay unit 73 to the modules 30 and 40, which are supposed to be supplied with the predetermined specification voltage, damage to the modules 30 and 40 can be reduced or prevented.

The power inputted from the first external power source 21 to the first relay unit 63 is determined to be DC power. Hence, the DC power supplied by the first relay unit 63 can operate the modules 30 and 40, which results in an easier activation of the modules.

The above embodiment may be implemented with the following modifications. The same parts as in the above embodiment will be omitted from the explanation with the same symbols.

The means of obtaining information on power specifications performed by communication controller 65 is not limited to communication with modules 30 and 40 operated by the power supplied by the first relay unit 63 as described in the embodiment. Alternatively, information on power specifications may be obtained by examining, for example, a voltage value (voltage level) set by the user according to desired power specifications of the modules 30 and Another modification is such that the power input from the first external power source 21 to the first relay unit 63 is determined to be AC power (1 specification, one type of specification) and the AC power supplied by the first relay unit 63 may be used to operate the modules 30 and 40. Even in this case, the first relay unit 63 is configured to receive power of only one specification inputted from the first external power supply 21. Therefore, the user is unlikely to make a mistake in the specifications of the power input to the first relay unit 63, and the power supplied by the first relay unit 63 can reliably operate the modules 30 and 40.

The connection switching circuit 80 in FIG. 4 can also be modified as follows. As an example, the comparator 90 and the IC 92 for Vref can be omitted from the configuration shown in FIG. 4, and instead, the communication controller 65 (power controller) detects the voltage of the power inputted to the second relay unit 73 by voltage sensors or other means. Furthermore, the communication controller 65 controls the transistor 85 based on a comparison of the detected voltage and a threshold value set based on a predetermined specification included in the acquired information, thus providing the same function as that described in the embodiment.

The power relay control performed by the power controller may be modified to handle the case where the power specification inputted to the second relay unit 73 is AC power and at least one of the power specifications of the respective modules 30 and 40 in the information obtained by the communication controller 65 shows DC power. In this case, it is sufficient to prohibit the second relay unit 73 from supplying power to modules 30 and 40 in the same manner as described above. Moreover, in this case, the configuration for detecting whether the specification of the power inputted to the second relay unit 73 is DC or AC power can be determined, for example, by detecting the voltage of the power inputted to the second relay unit 73 with a voltage sensor or other known means.

According to this configuration, even if AC power is mistakenly supplied to the modules 30 and 40, which are supposed to be supplied with DC power from the second relay unit 73, damage to the modules 30 and 40 can be reduced or avoided. The power controller may also prohibit the second relay unit 73 from supplying power to the modules 30 and 40 if the power specification inputted to the second relay unit 73 is DC power and at least one of the power specifications of the modules 30 and 40 included in the information obtained by the communication controller 65 is AC power. According to this configuration, damage to the modules 30 and 40 can be avoided or reduced even when the voltage of the DC power inputted to the second relay unit 73 is higher than the voltage of the AC power inputted to the second relay unit 73.

As another modification, a shutoff module can be provided to cut off the supply of power from the first module 30 to the second module 40 between the first and second modules 30 and 40. Such a shutoff module operates when the specification of the power supplied from the first module 30 to the second module 40 does not correspond to the specification of the power of the second module 40.

In the exemplified configuration, the PLC 10 can incorporate the power supply apparatus 50 therein into a united form, in terms of functionally or physically.

The above modifications may be implemented in combination. The foregoing embodiment and its modifications are not limited to those described above, but can be modified as appropriate to the extent not to depart from the gist of the invention.

DESCRIPTION OF PARTIAL REFERENCE SIGNS

21 . . . first external power source (external power source),
26 . . . second external power source (external power source),
30 . . . first module (serving as predetermined device),
40 . . . second module (serving as predetermined device),
50 . . . power supply apparatus,
63 . . . first relay unit,
65 . . . communication controller (also serving as information acquiring unit),
73 . . . second relay unit, and
80 . . . connection switching circuit

What is claimed is:

1. A power supply apparatus comprising:
a first relay unit configured to relay power, inputted from a first external power source, provided from outside the power supply apparatus, to be outputted from the first relay unit, power having only one type of power specification being allowed to be inputted to the first relay unit for the power relay thereof, the only one type of power specification being defined as either one of an AC power or a DC power with a voltage value designated in a limited range of AC or DC voltage values;
a second relay unit configured to relay power, inputted from a second external power source, provided from outside the power supply apparatus, to be outputted from the second relay unit, power having a plurality of types of power specifications being selectively allowed to be inputted to the second relay unit for the power relay thereof, the plurality of types of power specifications being defined as an AC power with a desired AC voltage value designated in a limited range of AC voltage values and a DC power with a DC voltage value designated in a limited range of DC voltage values, the second relay unit having terminal connections for common use for the AC power with the desired AC voltage value designated in the limited range of AC voltage values and the DC power with the DC voltage value designated in the limited range of DC voltage values,
wherein a module is electrically connected to the power supply apparatus via a bus line, the module being activated in response to the power supplied from the first relay unit, the module being assigned a predetermined power specification for the power to be supplied to the module from the second relay unit;
an information acquiring unit configured to acquire information including information showing the predetermined power specification, via the bus line, from the module that has been activated in response to the power supplied from the first relay unit; and
a power controller configured to
compare a voltage of the power inputted to the second relay unit with a reference voltage set based on the predetermined power specification,
prohibit the second relay unit from supplying the power to the module when the voltage of the power inputted to the second relay unit is higher than or equal to the reference voltage, and
allow the second relay unit to supply, via the bus line, the power to the module when the voltage of the power inputted to the second relay unit is lower than the reference voltage.

2. The power supply apparatus according to claim 1, wherein the information acquiring unit is configured to acquire, via the bus line, the information by communication with the module activated in response to the power supplied from the first relay unit.

3. The power supply apparatus according to claim 2, wherein the power inputted to the second relay unit from the second external power source is given a specification selectively set between the DC power and the AC power whose voltage is higher than the DC power.

4. The power supply apparatus according to claim 3, wherein
the power inputted to the first relay unit from the first external power source is set to the DC power with the voltage value designated in the limited range of AC or DC voltage values.

5. The power supply apparatus according to claim 4, wherein
the first relay unit is configured to output power therefrom via a first bus connector connected to the module, and
the second relay unit is configured to output power therefrom via a second bus connector connected to the module.

* * * * *